United States Patent
Wang

(10) Patent No.: US 12,557,026 B2
(45) Date of Patent: Feb. 17, 2026

(54) VOICE WAKE-UP METHOD, ELECTRONIC DEVICE, WEARABLE DEVICE, AND SYSTEM

(71) Applicant: Huawei Technologies Co., Ltd., Shenzhen (CN)

(72) Inventor: Hua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 544 days.

(21) Appl. No.: 18/001,961

(22) PCT Filed: May 31, 2021

(86) PCT No.: PCT/CN2021/097124
§ 371 (c)(1),
(2) Date: Dec. 15, 2022

(87) PCT Pub. No.: WO2021/254131
PCT Pub. Date: Dec. 23, 2021

(65) Prior Publication Data
US 2023/0239800 A1    Jul. 27, 2023

(30) Foreign Application Priority Data

Jun. 16, 2020    (CN) .......................... 202010550402.4

(51) Int. Cl.
*H04W 52/02*    (2009.01)
*G10L 15/08*    (2006.01)

(52) U.S. Cl.
CPC ......... *H04W 52/0254* (2013.01); *G10L 15/08* (2013.01); *H04W 52/0264* (2013.01)

(58) Field of Classification Search
CPC ......... H04W 52/0254; H04W 52/0264; H04W 4/80; G94W 88/02
See application file for complete search history.

(56) References Cited

U.S. PATENT DOCUMENTS

2015/0161998 A1\* 6/2015 Park ........................ G10L 15/24
704/231
2018/0061409 A1    3/2018 Valentine et al.
(Continued)

FOREIGN PATENT DOCUMENTS

| CN | 106714023 A | 5/2017 |
|----|-------------|--------|
| CN | 107093423 A | 8/2017 |
| WO | 2018075170 A1 | 4/2018 |

*Primary Examiner* — Jamal Javaid
(74) *Attorney, Agent, or Firm* — Slater Matsil, LLP

(57) ABSTRACT

A voice wake-up method, an electronic device, and a wearable device. The system includes the electronic device and the wearable device. The electronic device communicates with the wearable device through a short-distance wireless connection, and the electronic device is configured to: collect a voice signal in an environment in which the electronic device is located; and when the voice signal meets a preset condition, send a query request to the wearable device, where the query request is used to request information indicating that a user is speaking. The wearable device is configured to send a query result to the electronic device, where the query result includes the information indicating that the user is speaking. The electronic device is further configured to: when it is determined, based on the information indicating that the user is speaking, that the user is speaking, enter a wake-up state.

20 Claims, 6 Drawing Sheets

(56) References Cited

U.S. PATENT DOCUMENTS

2019/0349663 A1* 11/2019 Chen ................... G06F 3/011
2020/0005795 A1* 1/2020 Chae ............... H04W 52/0229

* cited by examiner

VOICE WAKE-UP METHOD, ELECTRONIC DEVICE, WEARABLE DEVICE, AND SYSTEM

CROSS-REFERENCE TO RELATED APPLICATIONS

This application is a national stage of International Application No. PCT/CN2021/097124, filed on May 31, 2021, which claims priority to Chinese Patent Application No. 202010550402.4, filed on Jun. 16, 2020. Both of the aforementioned applications are hereby incorporated by reference in their entireties.

TECHNICAL FIELD

This application relates to the terminal field, and more specifically, to a voice wake-up method, an electronic device, and a wearable device.

BACKGROUND

Although great progress has been made in voice wake-up, noise reduction, and recognition accuracy of intelligent voice devices on the market, human voice recognition is poor when there is background noise. Especially when a user is relatively away from a to-be-woken-up device and there is background noise, a wake-up rate is lower, and false wake-up is more likely to occur.

SUMMARY

This application provides a voice wake-up method, an electronic device, a wearable device, and a system, to help improve accuracy of performing voice wake-up by the electronic device.

According to a first aspect, a system is provided. The system includes an electronic device and a wearable device. The electronic device communicates with the wearable device through a short-distance wireless connection, and the electronic device is configured to collect a voice signal in an environment in which the electronic device is located. The electronic device is further configured to: when the voice signal meets a preset condition, send a query request to the wearable device, where the query request is used to request information indicating that a user is speaking. The wearable device is configured to send a query result to the electronic device, where the query result includes the information indicating that the user is speaking. The electronic device is further configured to enter a wake-up state when it is determined, based on the information indicating that the user is speaking, that the user is speaking.

In embodiments of this application, after determining that the voice signal includes a wake-up word and voiceprint information matches preset voiceprint information, the electronic device may query the information indicating that the user is speaking from the wearable device. When determining that the user is speaking, the electronic device performs a wake-up operation, to enter the wake-up state. The wearable device assists the electronic device in performing voice wake-up, which helps improve accuracy of voice wake-up.

In some possible implementations, the preset condition is that the voice signal includes the wake-up word; or the preset condition is that voiceprint information of the voice signal matches the preset voiceprint information; or the preset condition is that the voice signal includes the wake-up word and the voiceprint information of the voice signal matches the preset voiceprint information.

In some possible implementations, the information indicating that the user is speaking includes data detected by a sensor of the wearable device, and the electronic device is further configured to determine, based on the data detected by the sensor of the wearable device, that the user is speaking.

In this embodiment of this application, a characteristic that the electronic device has a relatively strong computing capability may be used. The wearable device only needs to send, to the electronic device, the data detected by the sensor, and the electronic device performs determining. This helps reduce a delay of the electronic device in a voice wake-up process, and also helps improve accuracy of voice wake-up.

With reference to the first aspect, in some implementations of the first aspect, the information indicating that the user is speaking is used to indicate a first confidence level and a second confidence level, the first confidence level is a confidence level of the user wearing the wearable device, and the second confidence level is a confidence level of the user speaking. The electronic device is specifically configured to enter the wake-up state when the first confidence level is greater than or equal to a first preset value and the second confidence level is greater than or equal to a second preset value.

In this embodiment of this application, the electronic device may determine, by using the first confidence level and the second confidence level that are indicated in the information indicating that the user is speaking, whether to perform the wake-up operation. The electronic device may perform the wake-up operation when determining that the user is wearing the wearable device and the user is speaking, to enter the wake-up state. The wearable device assists the electronic device in performing voice wake-up, which helps improve accuracy of voice wake-up.

With reference to the first aspect, in some implementations of the first aspect, the wearable device includes a sound sensor, and the wearable device is specifically configured to: determine the first confidence level based on a frequency of a human body heartbeat or breathing sound signal detected by a sound sensor within a preset detection periodicity; and determine the second confidence level based on strength of the sound signal within a preset frequency range.

In this embodiment of this application, the wearable device may detect the human body heartbeat or breathing sound signal by using the sound sensor, to determine the first confidence level and the second confidence level. In this way, the electronic device may determine, by using the first confidence level and the second confidence level, whether the user is speaking. The wearable device assists the electronic device in performing voice wake-up, which helps improve accuracy of voice wake-up.

In some possible implementations, the information indicating that the user is speaking may include the frequency of the human body heartbeat or breathing sound signal detected by the sound sensor of the wearable device within the preset periodicity, and the strength of the sound signal within the preset frequency range. The electronic device may determine, based on the information indicating that the user is speaking, the first confidence level and the second confidence level. In this way, the electronic device may determine, by using the first confidence level and the second confidence level, whether the user is speaking.

With reference to the first aspect, in some implementations of the first aspect, the wearable device includes a photo plethysmo graph PPG sensor, and the wearable device is specifically configured to: determine the first confidence level based on a frequency of a PPG signal detected by the PPG sensor within a preset detection periodicity; and determine the second confidence level based on strength of the PPG signal within a preset frequency range.

In this embodiment of this application, the wearable device may determine the first confidence level and the second confidence level by using the PPG signal detected by the PPG sensor. In this way, the electronic device may determine, by using the first confidence level and the second confidence level, whether the user is speaking. The wearable device assists the electronic device in performing voice wake-up, which helps improve accuracy of voice wake-up.

In some possible implementations, the information indicating that the user is speaking may include a frequency of the PPG signal detected by the PPG sensor of the wearable device within the preset detection periodicity and the strength of the PPG signal within the preset frequency range. The electronic device may determine, based on the information indicating that the user is speaking, the first confidence level and the second confidence level. In this way, the electronic device may determine, by using the first confidence level and the second confidence level, whether the user is speaking.

With reference to the first aspect, in some implementations of the first aspect, the wearable device includes a sound sensor, and the wearable device is specifically configured to: collect a human body heartbeat or breathing sound signal by using the sound sensor, and input the sound signal into a first model, a second model, and a third model, to obtain the first confidence level and the second confidence level, where the first model is obtained by collecting a noise signal generated when the user does not wear the wearable device, the second model is obtained by collecting a sound signal generated when the user wears the wearable device and does not speak, and the third model is obtained by collecting a sound signal generated when the user wears the wearable device and is speaking.

In this embodiment of this application, in a machine learning manner, the wearable device may input, into the first model, the second model, or the third model, the sound signal collected by the sound sensor, to obtain the first confidence level and the second confidence level. In this way, the electronic device may determine, by using the first confidence level and the second confidence level, whether the user is speaking. The wearable device assists the electronic device in performing voice wake-up, which helps improve accuracy of voice wake-up.

In some possible implementations, the electronic device stores the first model, the second model, and the third model. The information indicating that the user is speaking includes the human body heartbeat or breathing sound signal collected by using the sound sensor of the wearable device. The electronic device may input the sound signal into the first model, the second model, and the third model, to obtain the first confidence level and the second confidence level. In this way, the electronic device may determine, by using the first confidence level and the second confidence level, whether the user is speaking.

With reference to the first aspect, in some implementations of the first aspect, the wearable device includes a PPG sensor, and the wearable device is specifically configured to: collect a PPG signal by using the PPG sensor, and input the PPG signal into a first model, a second model, and a third model, to obtain the first confidence level and the second confidence level, where the first model is obtained by collecting a noise signal generated when the user does not wear the wearable device, the second model is obtained by collecting a PPG signal generated when the user wears the wearable device and does not speak, and the third model is obtained by collecting a PPG signal generated when the user wears the wearable device and is speaking.

In this embodiment of this application, in a machine learning manner, the wearable device may input, into the first model, the second model, or the third model, the PPG signal collected by the PPG sensor, to obtain the first confidence level and the second confidence level. In this way, the electronic device may determine, by using the first confidence level and the second confidence level, whether the user is speaking. The wearable device assists the electronic device in performing voice wake-up, which helps improve accuracy of voice wake-up.

In some possible implementations, the electronic device stores the first model, the second model, and the third model. The information indicating that the user is speaking includes the PPG signal collected by using the PPG sensor of the wearable device. The electronic device may input the PPG signal into the first model, the second model, and the third model, to obtain the first confidence level and the second confidence level. In this way, the electronic device may determine, by using the first confidence level and the second confidence level, whether the user is speaking.

With reference to the first aspect, in some implementations of the first aspect, a logged-in account of the electronic device is associated with a logged-in account of the wearable device.

In some possible implementations, the logged-in account of the electronic device and the logged-in account of the wearable device may be a same account; the logged-in account of the electronic device and the logged-in account of the wearable device are accounts in a same family group; or the logged-in account of the wearable device may be an account authorized by the logged-in account of the electronic device.

According to a second aspect, a voice wake-up method is provided, where the method is applied to an electronic device. The electronic device communicates with a wearable device through a short-distance wireless connection, and the method includes: The electronic device collects a voice signal in an environment in which the electronic device is located. When the voice signal meets a preset condition, the electronic device sends a query request to the wearable device, where the query request is used to request information indicating that a user is speaking. The electronic device receives a query result sent by the wearable device, where the query result includes the information indicating that the user is speaking. When determining, based on the information indicating that the user is speaking, that the user is speaking, the electronic device enters a wake-up state.

In embodiments of this application, after determining that the voice signal includes a wake-up word and that voiceprint information matches preset voiceprint information, the electronic device may query the information indicating that the user is speaking from the wearable device. When determining that the user is speaking, the electronic device performs a wake-up operation, to enter the wake-up state. The wearable device assists the electronic device in performing voice wake-up, which helps improve accuracy of voice wake-up.

In some possible implementations, the preset condition is that the voice signal includes the wake-up word; or the preset condition is that voiceprint information of the voice signal matches the preset voiceprint information; or the preset condition is that the voice signal includes the wake-up word and the voiceprint information of the voice signal matches the preset voiceprint information.

In some possible implementations, the information indicating that the user is speaking includes the data detected by a sensor of the wearable device, and that the electronic device determines, based on the information indicating that the user is speaking, that the user is speaking includes: The electronic device determines, based on the data detected by the sensor of the wearable device, that the user is speaking.

In some possible implementations, the information indicating that the user is speaking is used to indicate that the user is speaking.

With reference to the second aspect, in some implementations of the second aspect, the information indicating that the user is speaking is used to indicate a first confidence level and a second confidence level. The first confidence level is a confidence level of the user wearing the wearable device, and the second confidence level is a confidence level of the user speaking. That when determining, based on the information indicating that the user is speaking, that the user is speaking, the electronic device enters the wake-up state includes: When the first confidence level is greater than or equal to a first preset value and the second confidence level is greater than or equal to a second preset value, the electronic device enters the wake-up state.

In this embodiment of this application, the electronic device may determine, by using the first confidence level and the second confidence level that are indicated in the information indicating that the user is speaking, whether to perform the wake-up operation. The electronic device may perform the wake-up operation when determining that the user is wearing the wearable device and the user is speaking, to enter the wake-up state. The wearable device assists the electronic device in performing voice wake-up, which helps improve accuracy of voice wake-up.

In some possible implementations, the information indicating that the user is speaking may include a frequency of a human body heartbeat or breathing sound signal detected by a sound sensor of the wearable device within a preset periodicity, and strength of the sound signal within a preset frequency range. The method further includes: the electronic device determines the first confidence level based on a frequency of a human body heartbeat or breathing sound signal detected by the sound sensor within the preset detection periodicity; and the electronic device determines the second confidence level based on strength of the sound signal within the preset frequency range.

In some possible implementations, the information indicating that the user is speaking may include a frequency of a PPG signal detected by a PPG sensor of the wearable device within a preset detection periodicity and strength of the PPG signal within a preset frequency range. The method further includes: The electronic device determines the first confidence level based on the frequency of the PPG signal detected by the PPG sensor within the preset detection periodicity, and the electronic device determines the second confidence level based on the strength of the PPG signal within the preset frequency range.

In some possible implementations, the electronic device stores the first model, the second model, and the third model. The first model is obtained by collecting a noise signal generated when the user does not wear the wearable device; the second model is obtained by collecting a sound signal generated when the user wears the wearable device and does not speak; and the third model is obtained by collecting a sound signal generated when the user wears the wearable device and is speaking. The information indicating that the user is speaking includes the human body heartbeat or breathing sound signal collected by using the sound sensor of the wearable device. The method further includes: The electronic device inputs the sound signal into the first model, the second model, and the third model, to obtain the first confidence level and the second confidence level.

In some possible implementations, the electronic device stores the first model, the second model, and the third model. The first model is obtained by collecting a noise signal generated when the user does not wear the wearable device; the second model is obtained by collecting a PPG signal generated when the user wears the wearable device and does not speak; and the third model is obtained by collecting a PPG signal generated when the user wears the wearable device and is speaking. The information indicating that the user is speaking includes the PPG signal collected by using the PPG sensor of the wearable device. The method further includes: The electronic device inputs the PPG signal into the first model, the second model, and the third model, to obtain the first confidence level and the second confidence level.

With reference to the second aspect, in some implementations of the second aspect, a logged-in account of the electronic device is associated with a logged-in account of the wearable device.

In some possible implementations, the logged-in account of the electronic device and the logged-in account of the wearable device may be a same account; the logged-in account of the electronic device and the logged-in account of the wearable device are accounts in a same family group; or the logged-in account of the wearable device may be an account authorized by the logged-in account of the electronic device.

According to a third aspect, a voice wake-up method is provided, where the method is applied to a wearable device. The wearable device communicates with an electronic device through a short-distance wireless connection, and the method includes: A query request sent by the electronic device is received, where the query request is used to request information indicating that a user is speaking. A query result is sent to the electronic device, where the query result includes the information indicating that the user is speaking.

With reference to the third aspect, in some implementations of the third aspect, the information indicating that the user is speaking is configured to indicate a first confidence level and a second confidence level, where the first confidence level is a confidence level of the user wearing the wearable device, and the second confidence level is a confidence level of the user speaking.

With reference to the third aspect, in some implementations of the third aspect, the wearable device includes a sound sensor, and before the query result is sent to the electronic device, the method further includes: The first confidence level is determined based on a frequency of a human body heartbeat or breathing sound signal detected by the sound sensor within a preset detection periodicity, and the second confidence level is determined based on strength of the sound signal within a preset frequency range.

With reference to the third aspect, in some implementations of the third aspect, the wearable device includes a PPG sensor, and before the query result is sent to the electronic device, the method further includes: The first confidence level is determined based on a frequency of a PPG signal detected by the PPG sensor within a preset detection periodicity, and the second confidence level is determined based on strength of the PPG signal within a preset frequency range.

With reference to the third aspect, in some implementations of the third aspect, the wearable device includes a sound sensor. Before the query result is sent to the electronic device, the method further includes: A human body heartbeat or breathing sound signal is collected by using the sound sensor. The sound signal is input into a first model, a second model, and a third model, to obtain the first confidence level and the second confidence level. The first model is obtained by collecting a noise signal generated when the user does not wear the wearable device; the second model is obtained by collecting a sound signal generated when the user wears the wearable device and does not speak; and the third model is obtained by collecting a sound signal generated when the user wears the wearable device and is speaking.

With reference to the third aspect, in some implementations of the third aspect, the wearable device includes a PPG sensor. Before the query result is sent to the electronic device, the method further includes: A PPG signal is collected by using the PPG sensor. The PPG signal is input into a first model, a second model, and a third model, to obtain the first confidence level and the second confidence level. The first model is obtained by collecting a noise signal generated when the user does not wear the wearable device; the second model is obtained by collecting a PPG signal generated when the user wears the wearable device and does not speak; and the third model is obtained by collecting a PPG signal generated when the user wears the wearable device and is speaking.

With reference to the third aspect, in some implementations of the third aspect, a logged-in account of the electronic device is associated with a logged-in account of the wearable device.

According to a fourth aspect, a voice wake-up apparatus is provided. The apparatus is included in an electronic device, and the apparatus has functions of implementing the electronic device in the second aspect and the possible implementations of the second aspect. The function may be implemented by hardware, or may be implemented by executing corresponding software by hardware. The hardware or the software includes one or more modules or units corresponding to the foregoing function.

According to a fifth aspect, a voice wake-up apparatus is provided. The apparatus is included in a wearable device, and the apparatus has functions of implementing the wearable device in the third aspect and the possible implementations of the third aspect. The function may be implemented by hardware, or may be implemented by executing corresponding software by hardware. The hardware or the software includes one or more modules or units corresponding to the foregoing function.

According to a sixth aspect, an electronic device is provided, and the electronic device includes one or more processors, a memory, and one or more computer programs. The one or more computer programs are stored in the memory. The one or more computer programs include instructions. When the instructions are executed by the electronic device, the electronic device performs the voice wake-up method in any possible implementation of the second aspect.

According to a seventh aspect, a wearable device is provided, and the wearable device includes one or more processors, a memory, and one or more computer programs. The one or more computer programs are stored in the memory. The one or more computer programs include instructions. When the instructions are executed by the wearable device, the wearable device is enabled to perform the voice wake-up method in any possible implementation of the third aspect.

According to an eighth aspect, a chip system is provided, where the chip system is located in an electronic device. The chip system includes a system on chip SOC, and the SOC is configured to control a microphone to collect a voice signal in an environment in which the electronic device is located. The SOC is further configured to: when it is determined that the voice signal meets a preset condition, control the wireless communications module to send a query request to the wearable device, where the query request is used to request information indicating that a user is speaking. The SOC is further configured to control the wireless communications module to receive a query result sent by the wearable device, where the query result includes the information indicating that the user is speaking. The SOC is further configured to enter a wake-up state when it is determined, based on the information indicating that the user is speaking, that the user is speaking.

According to a ninth aspect, a chip system is provided, where the chip system is located in a wearable device. The wearable device includes an SOC, and the SOC is configured to control a wireless communications module to receive a query request sent by an electronic device, where the query request is used to request information indicating that the user is speaking. The SOC is further configured to control the wireless communications module to send a query result to the electronic device, where the query result includes the information indicating that the user is speaking.

According to a tenth aspect, a computer storage medium is provided, and the computer storage medium includes computer instructions. When the computer instructions run on an electronic device, the electronic device is enabled to perform the voice wake-up method in any possible implementation of the second aspect; or a wearable device is enabled to perform the voice wake-up method in any possible implementation of the third aspect.

According to an eleventh aspect, a computer program product is provided. When the computer program product runs on an electronic device, the electronic device is enabled to perform the voice wake-up method in any possible implementation of the second aspect; or a wearable device is enabled to perform the voice wake-up method in any possible implementation of the third aspect.

DETAILED DESCRIPTION OF ILLUSTRATIVE EMBODIMENTS

Terms used in the following embodiments are merely intended to describe specific embodiments, but are not intended to limit this application. The terms "one", "a" and "this" of singular forms used in this specification and the appended claims of this application are also intended to include expressions such as "one or more", unless otherwise specified in the context clearly. It should be further understood that in the following embodiments of this application, "at least one" and "one or more" mean one, two, or more. The term "and/or" is used to describe an association relationship between associated objects and represents that three relationships may exist. For example, A and/or B may represent the following cases: Only A exists, both A and B exist, and only B exists, where A and B each may be singular or plural. The character "/" generally indicates an "or" relationship between the associated objects.

Reference to "an embodiment", "some embodiments", or the like described in this specification indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

The following describes a designed electronic device provided in embodiments of this application, a user interface used for the electronic device, and embodiments used for using the electronic device. In some embodiments, the electronic device may be a portable electronic device including another function, such as a mobile phone or a tablet computer. An example embodiment of the portable electronic device includes but is not limited to a portable electronic device with an iOS, an Android, a Microsoft, or another operating system. The portable electronic device may alternatively be another portable electronic device, such as a laptop (Laptop). It should be further understood that in some other embodiments, the electronic device may not be a portable electronic device, but a desktop computer. In some embodiments, the electronic device may be a smart home appliance, such as a smart speaker or a smart home device.

Figure 1:
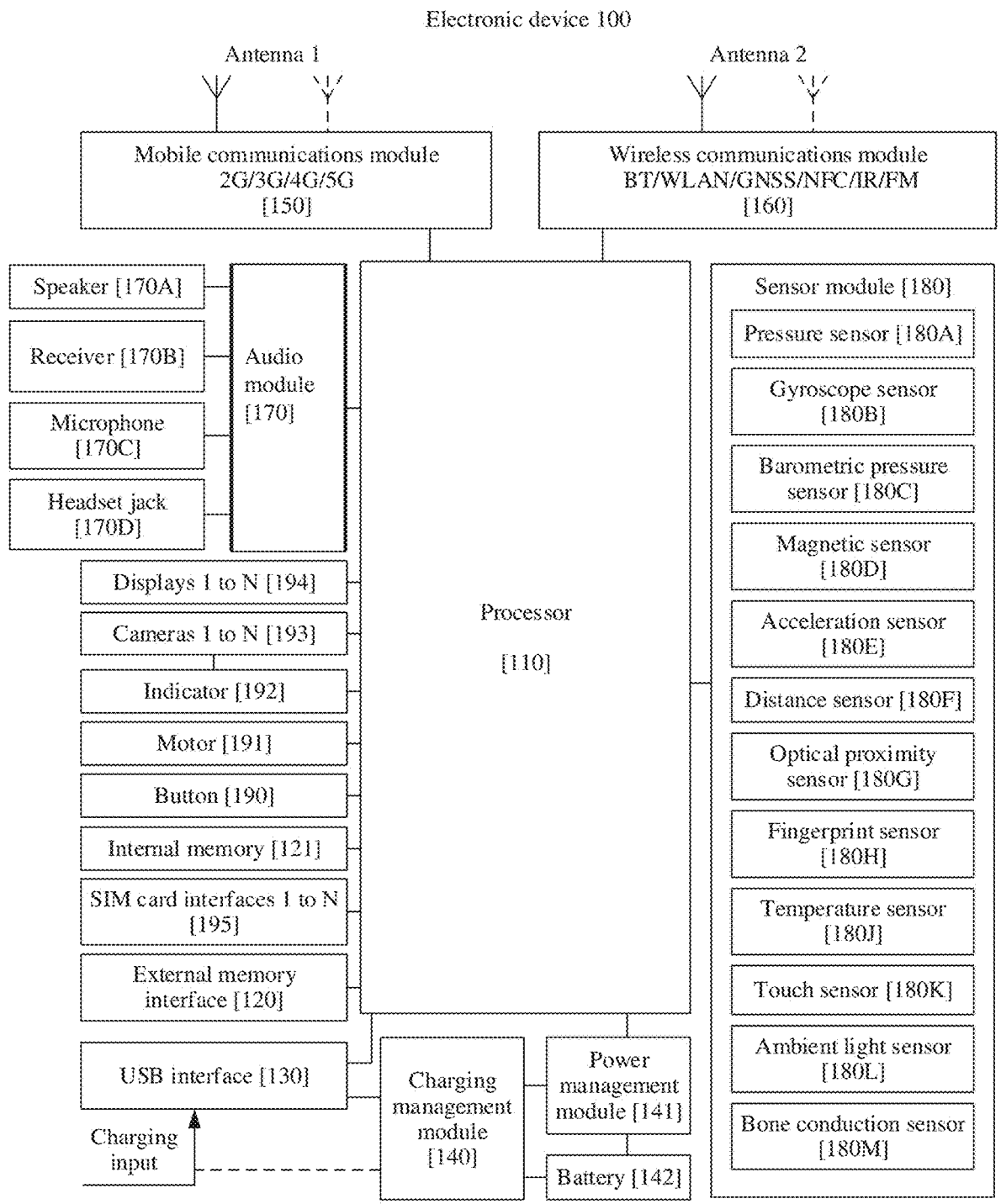
FIG. 1 is a schematic diagram of a hardware structure of an electronic device according to an embodiment of this application.

For example, FIG. 1 is a schematic diagram of a structure of an electronic device 100. The electronic device 100 may include a processor 110, an external memory interface 120, an internal memory 121, a universal serial bus (universal serial bus, USB) interface 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 280A, a gyroscope sensor 280B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure shown in this embodiment of this application does not constitute a specific limitation on the electronic device 100. In some other embodiments of this application, the electronic device 100 may include more or fewer components than those shown in the figure, or combine some components, or split some components, or have different component arrangements. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may be a nerve center and a command center of the electronic device 100. The controller may generate an operation control signal based on instruction operation code and a time sequence signal, to complete control of instruction fetching and instruction executing.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instruction or the data again, the processor may directly invoke the instruction or the data from the memory. This avoids repeated access, reduces waiting time of the processor 110, and improves system efficiency.

In this embodiment of this application, the processor 110 may include a wake-up processing module and a voiceprint processing module described in the following embodiments.

For example, the wake-up processing module in the processor 110 may analyze whether a speech signal in an environment includes a wake-up word, to determine whether there is a false wake-up.

For example, the voiceprint processing module in the processor 110 may analyze a similarity between voiceprint information in a voice signal and a voiceprint preset by a user.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes one serial data line (serial data line, SDA) and one serial clock line (serial clock line, SCL). The I2S interface may be configured to perform audio communication. In some embodiments, the processor 110 may include a plurality of groups of I2S buses. The PCM interface may also be used to perform audio communication, and sample, quantize, and code an analog signal. The UART interface is a universal serial data bus, and is configured to perform asynchronous communication. The MIPI interface may be configured to connect the processor 110 to a peripheral component such as the display 194 or the camera 193. The GPIO interface may be configured by software. The GPIO interface may be configured as a control signal or a data signal. The USB interface 130 is an interface that conforms to a USB standard specification, and may be specifically a mini USB interface, a micro USB interface, a USB type-C interface, or the like.

It can be understood that an interface connection relationship between the modules illustrated in this embodiment of this application is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from a charger.

The power management module 141 is configured to connect to the battery 142, the charging management module 140, and the processor 110. The power management module 141 receives input of the battery 142 and/or the charging management module 140, to supply power to the processor 110, the internal memory 121, an external memory, the display 194, the camera 193, the wireless communications module 160, and the like.

A wireless communications function of the electronic device 100 may be implemented through the antenna 1, the antenna 2, the mobile communications module 150, the wireless communications module 160, the modem processor, the baseband processor, and the like.

The wireless communications module 160 may provide a solution, applied to the electronic device 100, to wireless communications including a wireless local area network (wireless local area networks, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like. The wireless communications module 160 may be one or more components integrating at least one communications processor module. The wireless communications module 160 receives an electromagnetic wave by the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In this embodiment of this application, the electronic device 100 may send a query request to a wearable device by using the wireless communications module 160, where the query request is used to request the wearable device to determine whether the user is speaking, and may receive a query result from the wearable device by using the wireless communications module 160.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology.

The electronic device 100 implements a display function by using the GPU, the display 194, the application processor, and the like. The display 194 is configured to display an image, a video, and the like. The electronic device 100 may implement a photographing function through the ISP, the camera 193, the video codec, the GPU, the display 194, the application processor, and the like. The ISP is configured to process data fed back by the camera 193. The camera 193 is configured to capture a static image or a video.

The NPU is a neural-network (neural-network, NN) computing processor, quickly processes input information by referring to a structure of a biological neural network, for example, by referring to a mode of transfer between human brain neurons, and may further continuously perform self-learning. The electronic device 100 may implement applications such as intelligent cognition through the NPU, for example, image recognition, facial recognition, speech recognition, and text understanding.

For example, the wake-up processing module and the voiceprint processing module may also be included in the NPU calculation processor.

The external memory interface 120 may be configured to connect to an external memory card, for example, a micro SD card, to extend a storage capability of the electronic device 100. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The processor 110 runs the instructions stored in the internal memory 121, to implement various function applications of the electronic device 100 and data processing. The internal memory 121 may include a program storage area and a data storage area. The program storage area may store an operating system, an application required by at least one function (for example, a voice playing function or an image playing function), and the like. The data storage area may store data (such as audio data and a phone book) and the like created when the electronic device 100 is used. In addition, the internal memory 121 may include a high-speed random access memory, or may include a nonvolatile memory, for example, at least one magnetic disk storage device, a flash memory, or a universal flash storage (universal flash storage, UFS).

The electronic device 100 may implement an audio function, for example, music playing and recording, by using the audio module 170, the speaker 170A, the receiver 170B, the microphone 170C, the headset jack 170D, the application processor, and the like.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to implement a noise reduction function in addition to a function of collecting a sound signal. In some other embodiments, three, four, or more microphones 170C may be alternatively disposed in the electronic device 100, to collect a sound signal, implement noise reduction, and identify a sound source, to implement a directional recording function and the like.

In this embodiment of this application, the electronic device 100 may receive a voice signal in an environment by using the microphone 170C.

The pressure sensor 180A is configured to sense a pressure signal, and can convert the pressure signal into an electrical signal.

The gyroscope sensor 180B may be configured to determine a motion posture of the electronic device 100. In some embodiments, an angular velocity of the electronic device 100 around three axes (namely, axes x, y, and z) may be determined through the gyroscope sensor 180B.

The barometric pressure sensor 180C is configured to measure barometric pressure. In some embodiments, the electronic device 100 calculates an altitude by using a barometric pressure value measured by the barometric pressure sensor 180C, to assist in positioning and navigation.

The magnetic sensor 180D includes a Hall sensor. The electronic device 100 may detect opening and closing of a leather case by using the magnetic sensor 180D.

The acceleration sensor 180E may detect a magnitude of an acceleration of the electronic device wo in each direction (usually, on three axes). When the electronic device wo is still, the acceleration sensor may detect magnitude and a direction of gravity. The acceleration sensor may be further configured to identify a posture of the electronic device, and is used in an application such as switching between a landscape mode and a portrait mode or a pedometer.

The distance sensor 180F is configured to measure a distance. The electronic device 100 may measure a distance in an infrared manner or a laser manner. In some embodiments, in a photographing scenario, the electronic device 100 may measure a distance by using the range sensor 180F, to implement quick focusing.

The optical proximity sensor 180G may include, for example, a light emitting diode (LED) and an optical detector, for example, a photodiode. The light emitting diode may be an infrared light emitting diode. The electronic device 100 emits infrared light through the light-emitting diode. The electronic device wo detects infrared reflected light from a nearby object through the photodiode. When sufficient reflected light is detected, the electronic device may determine that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear to make a call, to automatically perform screen-off for power saving. The optical proximity sensor 180G may also be used in a smart cover mode or a pocket mode to automatically perform screen unlocking or locking.

The ambient light sensor 180L is configured to sense ambient light brightness. The electronic device wo may adaptively adjust brightness of the display 194 based on the sensed ambient light brightness.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J.

The touch sensor 180K is also referred to as a touch panel. The touch sensor 180K may be disposed on the display 194, and the touch sensor 180K and the display 194 constitute a touchscreen, which is also referred to as a "touchscreen".

The bone conduction sensor 180M may obtain a vibration signal. In some embodiments, the bone conduction sensor 180M may obtain a vibration signal of a vibration bone of a human vocal-cord part.

Before embodiments of this application are described, several concepts in voice wake-up are first described.

Wake-up word: A wake-up word is a character string used to wake up an electronic device. For example, the wake-up word is "XiaoYi XiaoYi" and the like.

Voice wake-up operation: A voice wake-up operation includes two pails: a wake-up operation and a recognition operation.

The wake-up operation means that a user says a wake-up word to wake up an electronic device, so that the electronic device is in a state of waiting for a voice instruction. Alternatively, the wake-up operation means that a user says a wake-up word, so that an electronic device enters a wake-up state. Alternatively, the wake-up operation may be that voiceprint information of a voice signal received by an electronic device matches preset voiceprint information, so that the electronic device enters a wake-up state.

Voice instruction: A voice instruction is an instruction for controlling, by using a voice, an electronic device to perform a corresponding voice operation. For example, the voice operation may be "book me an air ticket from Beijing to Shanghai tomorrow morning", "navigate home", "play music", and the like.

Recognition operation: After an electronic device is woken up, the user says a voice instruction to control the electronic device to perform a corresponding voice operation.

Currently, the following problems exist during device wake-up: If a user wakes up a wake-up device when a playback device plays audio, the audio played by the playback device may cause interference to the wake-up device. As a result, the wake-up device is woken up by mistake or cannot be woken up. For example, when an intelligent device (for example, a mobile phone) is placed beside a television, because "Auntie Auntie" uttered from a television series has a same pronunciation in mandarin with the wake-up word "Xiaoyi Xiaoyi" of the intelligent device, false wake-up of the intelligent device is caused.

In embodiments of this application, a voice signal in a human body is detected by using a feature that a human body is also a sound conductor and a sensor on a side that is of a wearable device and that is close to human skin, to determine whether a user is speaking. This helps improve accuracy of performing voice wake-up by an electronic device.

Figure 2:
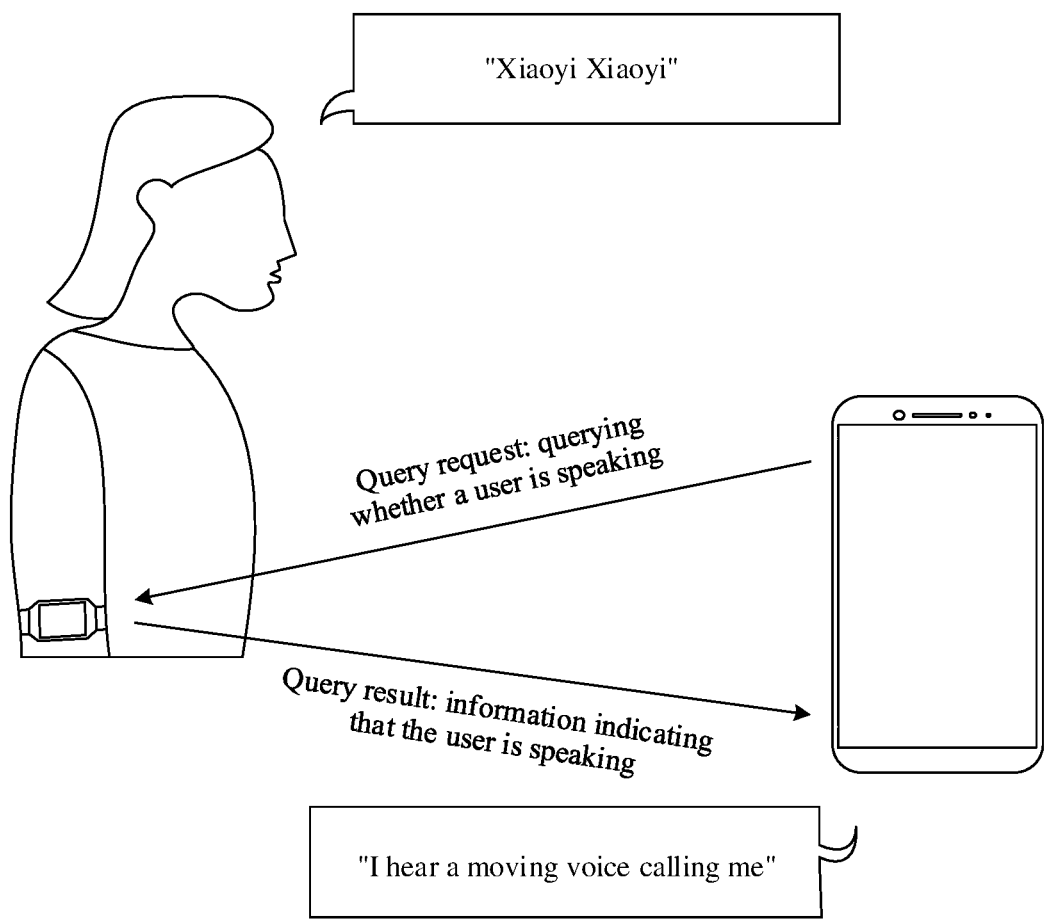
FIG. 2 is a group of graphical user interfaces according to an embodiment of this application.

FIG. 2 shows a group of graphical user interfaces (graphical user interface, GUI) according to an embodiment of this application.

As shown in FIG. 2, a user sends a voice instruction including a wake-up word "Xiaoyi Xiaoyi" to a mobile phone. After receiving the voice instruction of the user, the mobile phone may determine whether the voice instruction includes the wake-up word and whether voiceprint information in the voice instruction matches voiceprint information preset in the mobile phone. If the mobile phone determines that the voice instruction includes the wake-up word and the voiceprint information matches the voiceprint information preset in the mobile phone, the mobile phone may send a query request to a wearable device of the user, where the query request is used to query whether the user is speaking. The wearable device may determine, by using a sensor on a side close to a human body, whether the user is speaking.

The wearable device may send a query result to the mobile phone, where the query result includes information indicating that the user is speaking. After determining, based on the information indicating that the user is speaking, that the user is speaking, the mobile phone performs a wake-up operation, to enter a wake-up state. As shown in FIG. 2, the mobile phone may reply to the user that "I hear a moving voice calling me". In this embodiment of this application, when the mobile phone replies to the user that "I hear a moving voice calling me", it may indicate that the mobile phone enters the wake-up state.

In this embodiment of this application, when a wake-up operation is performed on an electronic device, the electronic device may continue to send a query request to a wearable device after determining that a voice instruction includes a wake-up word and that voiceprint information of the voice instruction matches voiceprint information preset in the electronic device. The wearable device may assist the electronic device in determining whether a user is speaking. When the electronic device determines, based on a query result, that the user is speaking, the electronic device may perform the wake-up operation. A manner in which the wearable device detects a sound in a human body helps improve accuracy of voice wake-up of the electronic device.

Figure 3:
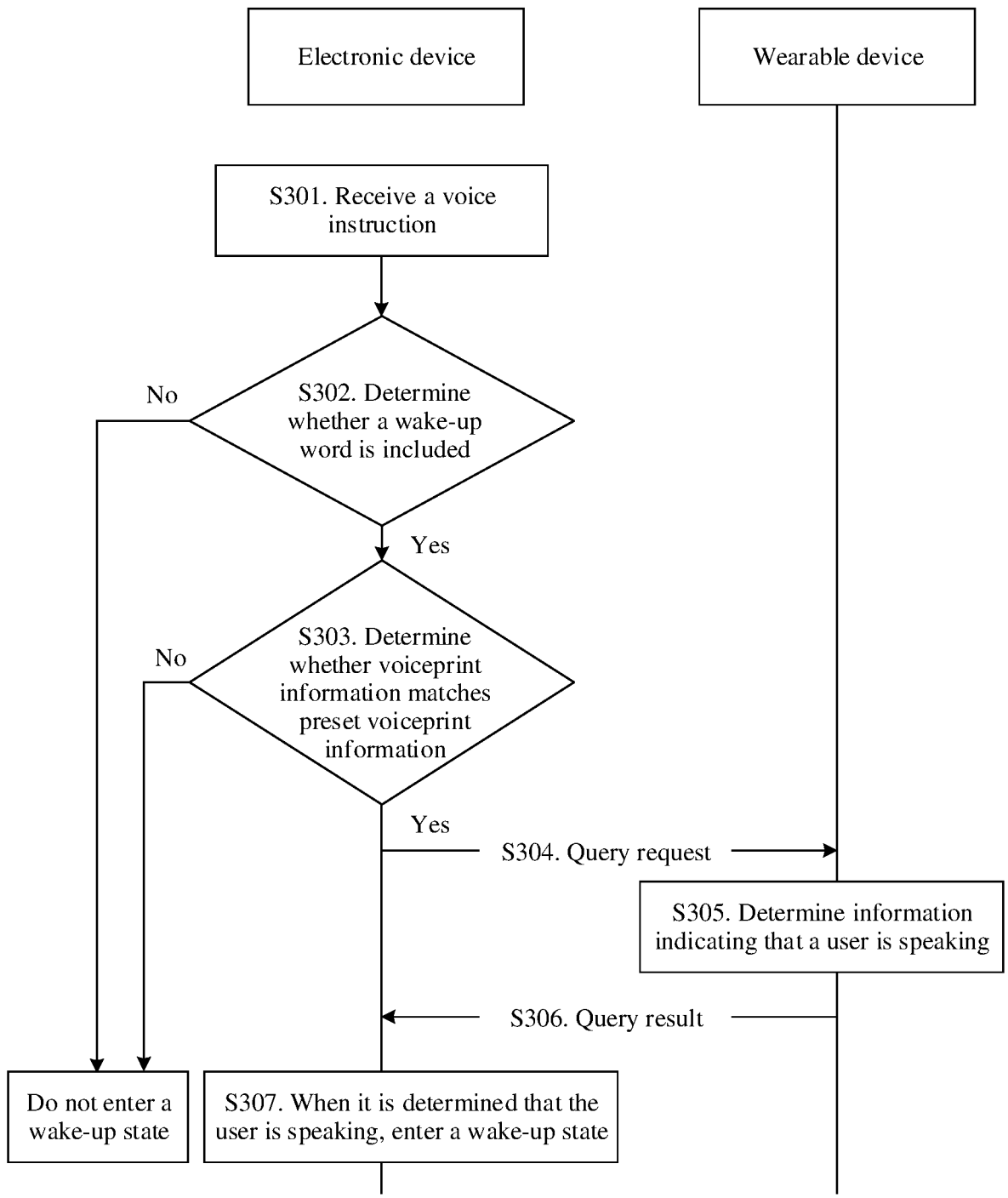
FIG. 3 is a schematic flowchart of a voice wake-up method according to an embodiment of this application.

FIG. 3 shows a schematic flowchart of a voice wake-up method 300 according to an embodiment of this application. As shown in FIG. 3, the method 300 may be performed by an electronic device and a wearable device, and the method 300 includes the following steps.

S301. The electronic device receives a voice instruction in an environment.

For example, as shown in FIG. 2, the mobile phone may receive a voice instruction "Xiaoyi Xiaoyi" in the environment.

S302. The electronic device determines whether the voice instruction includes a wake-up word.

For example, S302 may be performed by the wake-up processing module in the processor 110 in FIG. 1.

In an embodiment, the wake-up processing module may be a digital signal processor (digital signal processing, DSP). The DSP may process the voice instruction, to obtain, through analysis, whether the voice instruction includes the wake-up word.

In an embodiment, the wake-up processing module may include an automatic speech recognition (automatic speech recognition, ASR) module and a natural language understanding (natural language understanding, NLU) module.

The ASR module is mainly configured to recognize a speech of a user as text content, and the NLU module is mainly configured to understand an intent (intent) of the user, and perform slot (slot) parsing.

For example, as shown in FIG. 2, the user sends the voice instruction "Xiaoyi Xiaoyi". After receiving the voice instruction, the mobile phone may send the voice instruction to the ASR module, and the ASR module converts the voice into text information (for example, "Xiaoyi Xiaoyi"). In this way, the electronic device may determine that the voice instruction includes the wake-up word.

S303. The electronic device determines whether voiceprint information of the voice instruction matches voiceprint information preset in the electronic device.

For example, S303 may be performed by the voiceprint processing module in the processor 110 in FIG. 1.

The user may store, in the electronic device in advance, a recording including the wake-up word, and after obtaining the recording, the electronic device may analyze voiceprint information of the user. After the electronic device receives the voice instruction including the wake-up word, the electronic device may compare voiceprints in the voice instruction and the recording, to determine a similarity between the voiceprint information in the voice instruction and the voiceprint information in the recording. If the similarity is greater than a preset similarity, the electronic device may determine that the voiceprint information of the voice instruction matches the voiceprint information preset in the electronic device.

It should be understood that there is no actual sequence between S302 and S303. S302 may be performed before S303, or S303 may be performed before S302.

It should be further understood that for S302 and S303, refer to a process of determining whether a voice instruction includes a wake-up word and whether voiceprint information of the voice instruction matches preset voiceprint information in the current technology. This is not limited in this embodiment of this application. For example, the electronic device may generate, based on the voice instruction, a voice feature vector corresponding to the voice instruction, and the electronic device may match the voice feature vector with a user feature vector. When the matching succeeds, the electronic device sends a query request to the wearable device.

It should be further understood that, in this embodiment of this application, the electronic device may send the query request to the wearable device after determining that a voice signal meets a preset condition. The preset condition may be that the voice instruction in S302 and S303 includes the wake-up word and that the voiceprint information of the voice instruction matches the preset voiceprint information; the preset condition may be that the voice instruction includes the wake-up word; or the preset condition may be that the voiceprint information of the voice instruction matches the preset voiceprint information.

For example, when the mobile phone is in a screen-locked state and in a screen-off state, the mobile phone detects a voice instruction "open Camera" of the user. In this case, although the voice instruction does not include the wake-up word, the mobile phone may determine that voiceprint information of the voice instruction matches the preset voiceprint information. The mobile phone may determine that the user wants to wake up the mobile phone before opening Camera. In this case, the mobile phone may send a query request to the wearable device after determining that the voiceprint information of the voice instruction matches the preset voiceprint information.

S304. If the electronic device determines that the voice instruction includes the wake-up word and that the voiceprint information of the voice instruction matches the preset voiceprint information, the electronic device may send a query request to the wearable device, and the wearable device receives the query request sent by the electronic device, where the query request is used to request information indicating that the user is speaking.

In an embodiment, before the electronic device sends the query request to the wearable device, the electronic device establishes a connection to the wearable device by using near field communication. The near field communication includes but is not limited to near field communication technologies such as Wi-Fi, Bluetooth (Bluetooth, BT), and near field communication (near field communication, NFC).

In this embodiment of this application, a manner of sending the query request is not specifically limited. For example, the query request may be a message newly defined in the Wi-Fi protocol or the Bluetooth protocol. The message may carry a field, and the field is used to request the information indicating that the user is speaking.

Alternatively, the query request may be carried in an existing message of the Wi-Fi protocol or Bluetooth protocol.

For example, the query request may be carried in a Bluetooth low energy (Bluetooth low energy, BLE) data packet. The BLE data packet may be a directed broadcast packet, and the electronic device may learn of a media access control (media access control, MAC) address of the wearable device in advance. When the electronic device determines that the voice instruction includes the wake-up word and that the voiceprint information of the voice instruction matches the preset voiceprint information, the electronic device may send the BLE data packet to the wearable device by using the MAC address of the wearable device. The BLE data packet may carry a field, and the field is used to request the information indicating that the user is speaking.

In an embodiment, the electronic device and the wearable device may be devices under a same account. For example, a Huawei account A is logged in on the electronic device, and the Huawei account A is also logged in on the wearable device. In this case, the electronic device may learn of address information of the wearable device in advance, so that the electronic device may send the query request to the wearable device. Alternatively, the electronic device may send the query request to a cloud server, and the cloud server forwards the query request to the wearable device.

S305. The wearable device determines, based on the query request, the information indicating that the user is speaking.

In this embodiment of this application, the information indicating that the user is speaking may be a confidence level of the user speaking. The confidence level of the user speaking may be determined by using a sensor on the wearable device. Before the confidence level of the user speaking is determined, a confidence level of a sound signal may be first determined. The confidence level of the sound signal may also be understood as a confidence level of the user wearing the wearable device.

Figure 4:
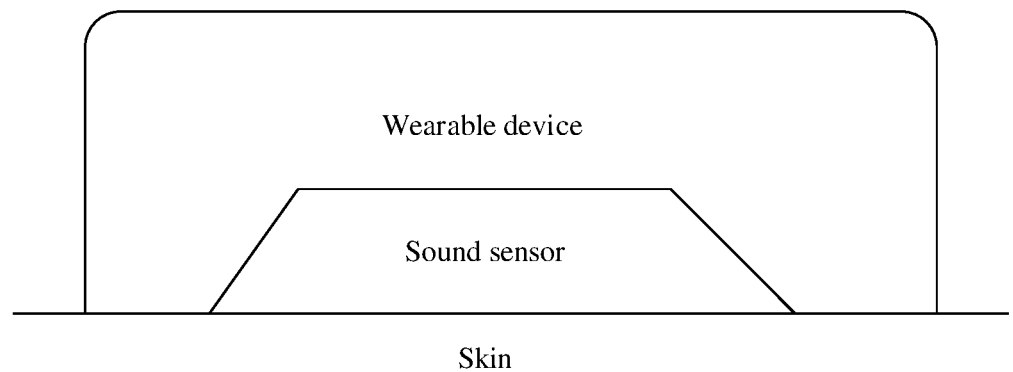
FIG. 4 is a schematic diagram of a wearable device according to an embodiment of this application.

In an embodiment, FIG. 4 is a schematic diagram of a wearable device. A sound sensor may be disposed on a side that is of the wearable device and that is close to skin, and the sound sensor may detect a sound in a body from the skin.

In this embodiment of this application, a principle of the sound sensor is to determine, by using the sound sensor and a feature that a human body is also a sound conductor, a parameter corresponding to a human body heartbeat or breathing sound, for example, a heartbeat frequency.

A method for determining the confidence level of the sound signal may be using a frequency range and an amplitude range of a human body heartbeat and a human body breathing sound as a detection rule. For example, a static heart rate of an adult ranges from 60 times to 100 times per minute, and a maximum heart rate reaches 200 times per minute during exercise. In this case, a periodic frequency of a heartbeat sound ranges from 1 Hz to 3.3 Hz. A sound frequency of a heartbeat sound is between 20 Hz and 500 Hz. In other words, if a sound of 20 Hz to 500 Hz is detected in a periodicity of 1 Hz to 3.3 Hz, the electronic device may determine that the confidence level of the sound signal is 1. This method is simple.

Another method for determining the confidence level of the sound signal is a machine learning method. Based on a sound detection model, a heartbeat or breathing sound collected by the sound sensor on the wearable device is used as training data, so that a model that can detect a heartbeat or breathing sound can be obtained through training. When a heartbeat sound or a breathing sound exists in an input sound signal, the model may output a confidence level (the confidence level is the confidence level of the sound signal) indicating whether a human body heartbeat sound or human body breathing sound is in the input sound signal. The model has high detection precision and strong anti-interference capability.

After determining the confidence level of the sound signal, the wearable device may then determine the confidence level of the user speaking.

A method for determining the confidence level of someone speaking is to extract the voice signal from a human body background sound (a heartbeat sound, a breathing sound, or the like), and calculate the confidence level of the wearer speaking.

For example, if a basic frequency of an adult female speech is 350 Hz to 3 kHz, a basic frequency of an adult male speech is 100 Hz to 900 Hz. Similarly, a sound detection rule may alternatively be used to set different sound detection frequencies based on a gender of a user.

In an embodiment, a sound detection frequency range may be set to [a, b] in the wearable device. In this case, the confidence level of the user speaking may be determined by using the following formula (1).

$$S = P/P_0 \qquad (1)$$

S is a confidence level of a user speaking, P is an average strength of sound signals detected in a detection periodicity when the sound signals are in a range of [a, b], and $P_0$ is a preset basic sound strength.

Another method for determining the confidence level of someone speaking is a machine learning method, which combines calculation of the confidence level ($S_1$) of the sound signal with calculation of the confidence level ($S_2$) that the user is speaking. A sound signal (including a heartbeat sound, a breathing sound, and a speaking sound) collected by the sound sensor on the wearable device when the user wears the wearable device and is speaking may be used as a training dataset A ($S_1=1$, $S_2=1$), a sound signal (including a heartbeat sound and a breathing sound) collected when the user wears the wearable device and does not speak is used as a training dataset B ($S_1=1$, $S_2=0$), and noise data (excluding a heartbeat sound, a breathing sound, and a speaking sound) collected when the user does not wear the wearable device is used as a training dataset C ($S_1=0$, $S_2=0$), so that a model that can simultaneously detect a heartbeat sound, a breathing sound, and a speaking sound can be obtained through training. When a sound signal or a noise signal detected by the sound sensor is input into the model, the model may output $S_1$ and $S_2$ at the same time.

The foregoing describes a process in which the wearable device determines the confidence level of the user speaking by disposing the sound sensor on the side close to skin. The following describes a process in which the confidence level of the user speaking is determined by using a photo plethysmo graph (photo plethysmo graph, PPG) sensor in the wearable device.

Figure 5:
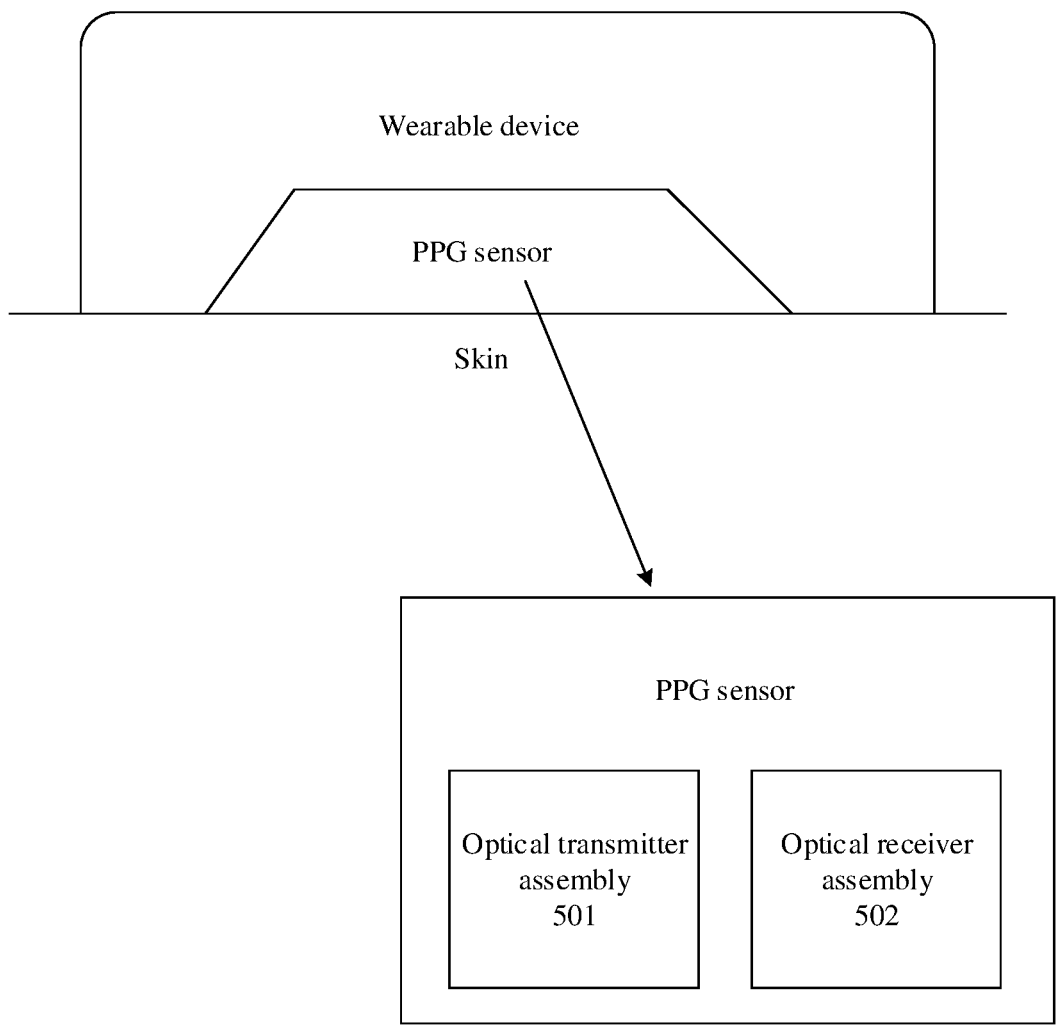
FIG. 5 is another schematic diagram of a wearable device according to an embodiment of this application.

FIG. 5 is a schematic diagram of a PPG sensor. As shown in FIG. 5, the PPG sensor includes an optical transmitter assembly 501 and an optical receiver assembly 502. A green light emitting diode (light emitting diode, LED) light in the optical transmitter assembly 501 of the PPG sensor of the wearable device is used with a photosensitive photodiode to irradiate blood. Because blood of different volumes in blood vessels absorbs green light differently, when a heart beats, a blood flow rate increases, and an absorption amount of green light increases as the blood flow rate increases; and the blood flow decreases at a heartbeat interval, and the absorption amount of green light decreases as the blood flow decreases. Therefore, a heart rate can be measured based on an absorbance of blood.

Specifically, when a light beam of a specific wavelength is irradiated to a skin surface, the light beam passes through the skin and is transmitted to the optical receiver assembly 502. In this process, due to attenuation caused by absorption of skin muscles and blood, intensity of light detected by the optical receiver assembly 502 is weakened. Reflection of the skin, bones, meat, fat, and the like of the human body to light is a fixed value, and capillaries continuously increase and decrease with a pulse volume under an action of the heart. When the heart is systolic, a peripheral blood volume is the largest, a light absorption amount is also the largest, and the light intensity detected by the optical receiver assembly 502 is the smallest. On the contrary, when the heart is diastolic, the detected light intensity is the largest. In this way, the light intensity received by the optical receiver assembly 502 shows a pulsatile change accordingly.

The PPG sensor has been widely applied to heart rate detection. When a user speaks, a blood cell also vibrates. Consequently, a blood cell vibration frequency and amplitude detected when the user speaks are different from those detected when the user does not speak, so that the wearable device can determine the confidence level of the user speaking.

In an embodiment, before the confidence level of the user speaking is determined by using the PPG sensor, the confidence level of the sound signal may be first determined.

A method for determining the confidence level of the sound signal may be using a vibration frequency and an amplitude range of a blood cell of a human body as a detection rule. For a specific process, refer to the foregoing process of determining the confidence level of the sound signal by using the sound sensor. For brevity, details are not described herein again.

Another method for determining the confidence level of the sound signal is a machine learning method. Based on a PPG signal detection model, a frequency and an amplitude (or a blood cell vibration frequency and a blood cell vibration amplitude) of a PPG signal actually collected by the PPG sensor on the wearable device are used as training data, to obtain, through training, a model that can detect a frequency and an amplitude of a PPG signal. When the frequency and the amplitude of the PPG signal detected by the PPG sensor are input into the model, the model may output the confidence level of the sound signal. The model has high detection precision and strong anti-interference capability.

After determining the confidence level of the sound signal, the wearable device may then determine the confidence level of the user speaking.

A method for determining a confidence level of someone speaking is to extract a voice signal from the PPG signal, and calculate and output the confidence level of the wearer speaking.

For a process of determining the confidence level of the user speaking by using the frequency of the voice signal, refer to the foregoing process of extracting the voice signal from the human body background sound (a heartbeat sound, a breathing sound, or the like), and calculating and outputting the confidence level of the wearer speaking. For brevity, details are not described herein again.

Another method for determining the confidence level of the user speaking is a machine learning method. Calculation of the confidence level ($S_1$) of the sound signal and calculation of the confidence level ($S_2$) that the user is speaking are combined. To be specific, a PPG signal collected by the PPG sensor on the wearable device when the user wears the wearable device and is speaking may be used as a training dataset D ($S_1=1$, $S_2=1$), a PPG signal collected when the user wears the wearable device and does not speak is used as a training dataset E ($S_1=1$, $S_2=0$), and noise data (excluding a PPG signal) collected when the user does not wear the wearable device is used as a training dataset F ($S_1=0$, $S_2=0$). In this way, a model that can simultaneously detect PPG signals can be obtained through training. When a PPG signal detected by the wearable device is input into the model, the model may output both $S_1$ and $S_2$.

The foregoing is described by using an example in which the wearable device determines the confidence level of the sound signal and the confidence level of the user speaking. In this embodiment of this application, the confidence level of the sound signal and the confidence level of the user speaking may alternatively be determined by the electronic device.

For example, a query result sent by the wearable device to the electronic device may include data collected by a sensor (for example, a sound sensor or a PPG sensor) of the wearable device. For example, the query result may include a sound signal collected by the sound sensor. After the electronic device receives the sound signal, the electronic device may input the sound signal into a training data set A, a training data set B, and a training data set C that are stored in the electronic device, so that the electronic device can obtain the confidence level of the sound signal and the confidence level of the user speaking.

For another example, the query result may include a PPG signal collected by the PPG sensor. After the electronic device receives the PPG signal, the electronic device may input the PPG signal into a training data set D, a training data set E, and a training data set F that are stored in the electronic device, so that the electronic device can obtain the confidence level of the sound signal and the confidence level of the user speaking.

It should be understood that for a process in which the electronic device determines the confidence level of the sound signal and the confidence level of the user speaking by using the data collected by the sensor of the wearable device, refer to the foregoing process in which the wearable device determines the confidence level of the sound signal and the confidence level of the user speaking. For brevity, details are not described herein again.

S306. The wearable device sends a query result to the electronic device, and the electronic device receives the query result sent by the wearable device, where the query result includes the information indicating that the user is speaking.

In an embodiment, the information indicating that the user is speaking includes the confidence level of the sound signal and the confidence level of the user speaking.

In an embodiment, if the wearable device determines that the confidence level of the sound signal is less than a first preset value, the wearable device may directly indicate, in the query result, that the user does not wear the wearable device. In this case, the electronic device may determine, by using the current technology, whether to enter a wake-up state. Alternatively, if the wearable device determines that the confidence level of the sound signal is less than a first preset value, the wearable device may indicate, in the query result, that the confidence level of the user speaking is unknown, and the electronic device may determine, by using the current technology, whether to enter a wake-up state.

Alternatively, if the wearable device determines that the confidence level of the sound signal is less than a first preset value, the wearable device may not send the query result to the electronic device. If the electronic device does not receive the query result within preset duration, the electronic device may determine that the user does not wear the wearable device. In this case, the electronic device may determine, by using the current technology, whether to enter a wake-up state.

In this embodiment of this application, after determining that the confidence level of the sound signal is greater than or equal to the first preset value and the confidence level of the user speaking is greater than or equal to a second preset value, the wearable device may indicate, in the query result, that the user is speaking. Alternatively, the confidence level of the sound signal and the confidence level of the user speaking may be carried in the query result and sent to the electronic device by the wearable device, so that the electronic device determines whether the user is speaking. For example, if the electronic device determines that the confidence level of the sound signal is greater than or equal to the first preset value and the confidence level of the user speaking is greater than or equal to the second preset value, the electronic device may determine that the user is speaking, and enter the wake-up state.

In this embodiment of this application, a manner of sending the query result is not specifically limited. For example, the query result may be a message newly defined in the Wi-Fi protocol or the Bluetooth protocol. The message may carry a field, and the field is used to indicate the information indicating that the user is speaking.

Alternatively, the query result may be carried in an existing message of the Wi-Fi protocol or Bluetooth protocol.

For example, the query result may be carried in a BLE data packet. The BLE data packet may be a directed broadcast packet, and the wearable device may learn of a MAC address of the electronic device in advance. In this case, the wearable device may send the BLE data packet to the electronic device based on the MAC address of the electronic device. The BLE data packet may carry a field, and the field is used to request the information indicating that the user is speaking.

For example, the information indicating that the user is speaking may be indicated by using 2 bits. "11" indicates that the user is wearing the wearable device and the user is speaking; "10" indicates that the user is wearing the wearable device and the user does not speak; and "00" indicates that the user does not wear the wearable device.

For another example, the information indicating that the user is speaking may also be indicated by using 1 bit. "1" indicates that the user is speaking, and "0" indicates that the user does not speak.

In an embodiment, the information indicating that the user is speaking includes data collected by a sensor (for example, a sound sensor or a PPG sensor) of the wearable device.

S307. If the electronic device determines, based on the information indicating that the user is speaking, that the user is speaking, the electronic device enters the wake-up state.

It should be understood that, in this embodiment of this application, when determining that the user is speaking, the electronic device may perform a wake-up operation, and performing the wake-up operation may enable the electronic device to enter the wake-up state from a non-wakeup state.

In an embodiment, if the query result received by the electronic device includes the confidence level of the sound signal and the confidence level of the user speaking that are sent by the wearable device, the electronic device may perform the wake-up operation and enter the wake-up state when determining that the confidence level of the sound signal is greater than or equal to the first preset value and the confidence level of the user speaking is greater than or equal to the second preset value.

In an embodiment, if the query result received by the electronic device indicates that the user is speaking, the electronic device may directly perform the wake-up operation, to enter the wake-up state.

It should be understood that, if the query result received by the electronic device includes the confidence level of the sound signal and the confidence level of the user speaking that are sent by the wearable device, and the confidence level of the sound signal is less than the first preset value, the electronic device may not enter the wake-up state.

Alternatively, if the confidence level of the sound signal is greater than or equal to the first preset value and the confidence level of the user speaking is less than the second preset value, the electronic device may not enter the wake-up state.

It should be further understood that if the electronic device does not receive the query result within the preset duration, the electronic device may learn that the user does not wear the wearable device, and the electronic device may determine, by using the current technology, whether to enter the wake-up state.

In an embodiment, the information indicating that the user is speaking includes data collected by a sensor (for example, a sound sensor or a PPG sensor) of the wearable device. After receiving the data collected by the sensor of the wearable device, the electronic device may determine the confidence level of the sound signal and the confidence level of the user speaking by using the data collected by the sensor of the wearable device. Then, whether the user is speaking may be determined based on the two confidence levels.

In this embodiment of this application, in a manner of detecting a human body sound, the wearable device may send the information indicating that the user is speaking to the electronic device, and the electronic device determines, based on the information indicating that the user is speaking, whether the user is speaking. This helps improve voice wake-up accuracy.

Figure 6:
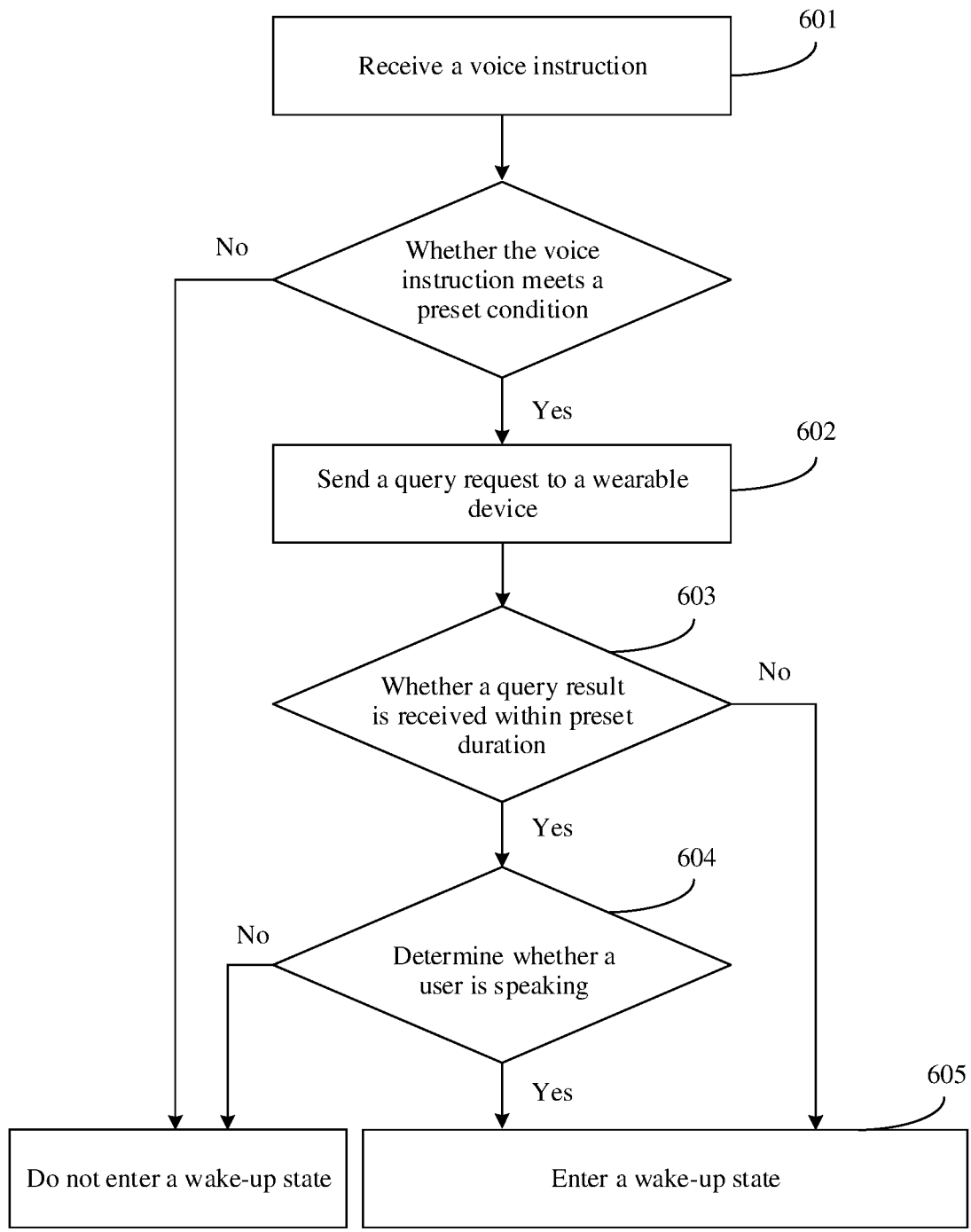
FIG. 6 is another schematic flowchart of a voice wake-up method according to an embodiment of this application.

FIG. 6 shows a schematic flowchart of another voice wake-up method 600 according to an embodiment of this application. As shown in FIG. 6, the method 600 may be performed by an electronic device, and the method 600 includes the following steps.

S601. Receive a voice instruction in an environment.

S602. If the electronic device determines that the voice signal meets a preset condition, the electronic device may send a query request to a wearable device, where the query request is used to request information indicating that a user is speaking.

It should be understood that for a process in which the electronic device determines that the voice instruction meets the preset condition, refer to the process of S302 and S303 in the foregoing method 300. For brevity, details are not described herein again.

It should be further understood that for a process in which the electronic device sends the query request to the wearable device, refer to S304 in the foregoing method 300. For brevity, details are not described herein again.

S603. The electronic device determines whether a query result is received within preset duration.

In an embodiment, if the electronic device does not receive the query result within the preset duration, the electronic device may determine that the wearable device is relatively far away from the electronic device, or the electronic device may determine that the user does not wear the wearable device, and the electronic device may determine, according to the current technology, whether to enter a wake-up state. For example, when determining that the voice instruction includes a wake-up word and voiceprint information of the voice instruction matches preset voiceprint information, the electronic device enters the wake-up state.

S604. If the electronic device receives the query result within the preset duration and the query result includes the information indicating that the user is speaking, the electronic device determines, based on the information indicating that the user is speaking, whether the user is speaking.

In an embodiment, the information indicating that the user is speaking includes a confidence level of a sound signal and a confidence level of the user speaking. Then, when the electronic device determines that the confidence level of the sound signal is greater than or equal to a first preset value and the confidence level of the user speaking is greater than or equal to a second preset value, the electronic device may enter the wake-up state.

In an embodiment, the information indicating that the user is speaking directly indicates whether the user is speaking. For example, when the information indicating that the user is speaking (for example, a value of a field carried in a BLE data packet is "1") indicates that the user is speaking, the electronic device may enter the wake-up state; or when the information indicating that the user is speaking (for example, a value of a field carried in a BLE data packet is "0") indicates that the user does not speak, the electronic device may not enter the wake-up state.

In an embodiment, the information indicating that the user is speaking may alternatively be data collected by a sensor (for example, a sound sensor or a PPG sensor) of the wearable device. In this case, the electronic device may determine, based on the data collected by the sensor of the wearable device, whether the user is speaking. For example, the electronic device may determine the confidence level of the sound signal and the confidence level of the user speaking based on the data collected by the sensor of the wearable device, to determine, based on the two confidence levels, whether the user is speaking.

It should be understood that for a process in which the electronic device determines, based on the information indicating that the user is speaking, whether the user is speaking, refer to the process of S307 in the foregoing method 300. For brevity, details are not described herein again.

S605. If the electronic device determines that the user is speaking, the electronic device enters the wake-up state.

In an embodiment, if the electronic device determines, based on the information indicating that the user is speaking, that the user does not speak, the electronic device may not enter the wake-up state.

In this embodiment of this application, in a manner of detecting a human body sound, the wearable device may send the information indicating that the user is speaking to the electronic device, and the electronic device determines, by using the information indicating that the user is speaking, whether the user is speaking. This helps improve voice wake-up accuracy.

An embodiment of this application further provides an electronic device. The electronic device may include the processor 110 and the wireless communications module 160 shown in FIG. 1. The wireless communications module 160 may be configured to perform the steps of sending the query request to the wearable device in S602 and receiving the query result sent by the wearable device in S604. The processor 110 may be configured to perform the steps of determining, based on the information indicating that the user is speaking, whether the user is speaking in S603 and S604, and S605.

Figure 7:
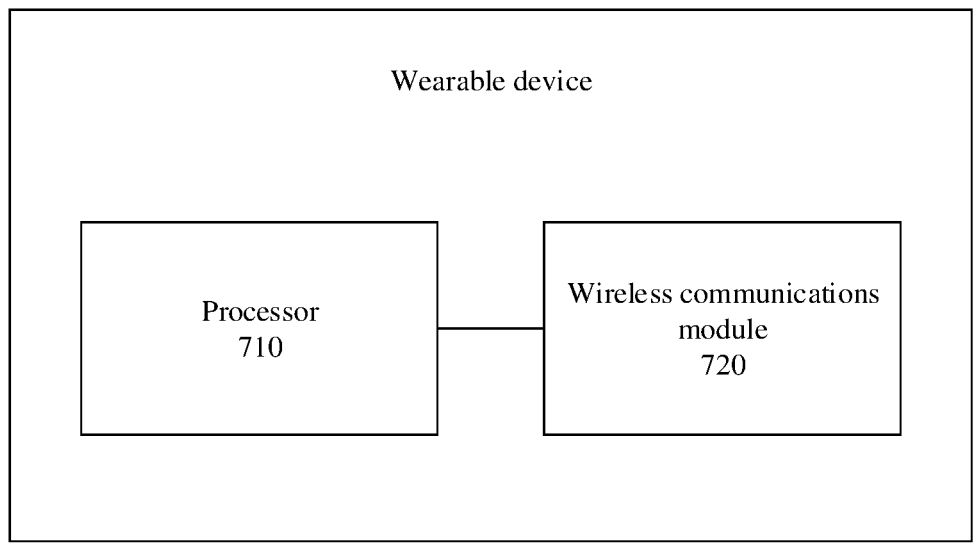
FIG. 7 is a schematic block diagram of a wearable device according to an embodiment of this application.

FIG. 7 shows a schematic block diagram of a wearable device according to an embodiment of this application. The wearable device may include a processor 710 and a wireless communications module 720. The wireless communications module 720 may be configured to perform the steps of receiving the query request sent by the electronic device in S304 and sending the query result to the electronic device in S306. The processor 710 may be configured to perform the step of determining the information indicating that the user is speaking in S305.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk drive, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A system, comprising:
an electronic device; and
a wearable device, wherein the wearable device communicates with the wearable device through a short-distance wireless connection;
wherein the electronic device is configured to:
collect a voice signal in an environment in which the electronic device is located; and
when the voice signal meets a preset condition, send a query request to the wearable device, wherein the query request requests information indicating that a user is speaking;
wherein the wearable device is configured to send a query result to the electronic device, wherein the query result comprises the information indicating that the user is speaking, wherein the information indicating that the user is speaking indicates a first confidence level and a second confidence level, the first confidence level is a confidence level of the user wearing the wearable device, and the second confidence level is a confidence level of the user speaking; and
wherein the electronic device is further configured to:
when the first confidence level is greater than or equal to a first preset value and the second confidence level is greater than or equal to a second preset value, enter a wake-up state.

2. The system according to claim 1, wherein the wearable device comprises a sound sensor, and the wearable device is further configured to:
determine the first confidence level based on a sound signal detected by the sound sensor within a preset detection period, wherein the sound signal is a frequency of a human body heartbeat or a breathing sound signal; and
determine the second confidence level based on a strength of the sound signal within a preset frequency range.

3. The system according to claim 1, wherein the wearable device comprises a photo plethysmo graph (PPG) sensor, and the wearable device is configured to:
determine the first confidence level based on a frequency of a PPG signal detected by the PPG sensor within a preset detection period; and
determine the second confidence level based on a strength of the PPG signal within a preset frequency range.

4. The system according to claim 1, wherein the wearable device comprises a sound sensor, and the wearable device is configured to:
collect a sound signal using the sound sensor, wherein the sound signal is a human body heartbeat or a breathing sound signal; and
input the sound signal into a first model, a second model, and a third model, to obtain the first confidence level and the second confidence level, wherein the first model is obtained by collecting a noise signal generated when the user does not wear the wearable device, the second model is obtained by collecting a sound signal generated when the user wears the wearable device and does not speak, and the third model is obtained by collecting a sound signal generated when the user wears the wearable device and is speaking.

5. The system according to claim 1, wherein the wearable device comprises a photo plethysmo graph (PPG) sensor, and the wearable device is configured to:
collect a PPG signal using the PPG sensor; and
input the PPG signal into a first model, a second model, and a third model, to obtain the first confidence level and the second confidence level, wherein the first model is obtained by collecting a noise signal generated when the user does not wear the wearable device, the second model is obtained by collecting a PPG signal generated when the user wears the wearable device and does not speak, and the third model is obtained by collecting a PPG signal generated when the user wears the wearable device and is speaking.

6. The system according to claim 1, wherein a logged-in account of the electronic device is associated with a logged-in account of the wearable device.

7. An electronic device, comprising:
one or more processors; and
one or more memories;
wherein the one or more memories store one or more computer programs, the one or more computer programs comprise instructions, and when the instructions are executed by the one or more processors, the electronic device is enabled to perform the following steps:
collecting a voice signal in an environment in which the electronic device is located;
when the voice signal meets a preset condition, sending a query request to a wearable device, wherein the query request requests information indicating that a user is speaking, and wherein the electronic device communicates with the wearable device through a short-distance wireless connection;
receiving a query result sent by the wearable device, wherein the query result comprises the information indicating that the user is speaking, and wherein the information indicating that the user is speaking indicates a first confidence level and a second confidence level, the first confidence level is a confidence level of the user wearing the wearable device, the second confidence level is a confidence level of the user speaking; and
entering a wake-up state when the first confidence level is greater than or equal to a first preset value and the second confidence level is greater than or equal to a second preset value.

8. The electronic device according to claim 7, wherein a logged-in account of the electronic device is associated with a logged-in account of the wearable device.

9. A wearable device, comprising:
one or more processors; and
one or more memories,
wherein the one or more memories store one or more computer programs, the one or more computer programs comprise instructions, and when the instructions are executed by the one or more processors, the wearable device is enabled to perform the following steps:

receiving a query request sent by an electronic device, wherein the query request requests information indicating that a user is speaking, and the wearable device communicates with the electronic device through a short-distance wireless connection; and sending a query result to the electronic device, wherein the query result comprises the information indicating that the user is speaking, wherein the information indicating that the user is speaking indicates a first confidence level and a second confidence level, the first confidence level is a confidence level of the user wearing the wearable device, and the second confidence level is a confidence level of a voice signal.

10. The wearable device according to claim 9, wherein the wearable device comprises a sound sensor, and when the instructions are executed by the one or more processors, the wearable device is enabled to perform the following steps:

determining the first confidence level based on a sound signal detected by the sound sensor within a preset detection period, wherein the sound signal is a frequency of a human body heartbeat or a breathing sound signal; and determining the second confidence level based on strength of the sound signal within a preset frequency range.

11. The wearable device according to claim 9, wherein the wearable device comprises a photo plethysmo graph (PPG) sensor, and when the instructions are executed by the one or more processors, the wearable device is enabled to perform the following steps:

determining the first confidence level based on a frequency of a PPG signal detected by the PPG sensor within a preset detection period; and determining the second confidence level based on a strength of the PPG signal within a preset frequency range.

12. The wearable device according to claim 9, wherein the wearable device comprises a sound sensor, and when the instructions are executed by the one or more processors, the wearable device is enabled to perform the following steps:

collecting a sound signal using the sound sensor, wherein the sound signal is a human body heartbeat or a breathing sound signal; and inputting the sound signal into a first model, a second model, and a third model, to obtain the first confidence level and the second confidence level, wherein the first model is obtained by collecting a noise signal generated when the user does not wear the wearable device, the second model is obtained by collecting a sound signal generated when the user wears the wearable device and does not speak, and the third model is obtained by collecting a sound signal generated when the user wears the wearable device and is speaking.

13. The wearable device according to claim 9, wherein the wearable device comprises a photo plethysmo graph (PPG) sensor, and when the instructions are executed by the one or more processors, the wearable device is enabled to perform the following steps:

collecting a PPG signal by using the PPG sensor; and inputting the PPG signal into a first model, a second model, and a third model, to obtain the first confidence level and the second confidence level, wherein the first model is obtained by collecting a noise signal generated when the user does not wear the wearable device, the second model is obtained by collecting a PPG signal generated when the user wears the wearable device and does not speak, and the third model is obtained by collecting a PPG signal generated when the user wears the wearable device and is speaking.

14. The wearable device according to claim 9, wherein a logged-in account of the electronic device is associated with a logged-in account of the wearable device.

15. The system according to claim 1, wherein the voice signal meets the preset condition when the voice signal includes a wake-up word and voiceprint information in the voice signal matches preset voiceprint information.

16. The electronic device according to claim 7, wherein the voice signal meets the preset condition when the voice signal includes a wake-up word and voiceprint information in the voice signal matches preset voiceprint information.

17. The system according to claim 1, wherein the voice signal meets the preset condition when voiceprint information in the voice signal matches preset voiceprint information.

18. The electronic device according to claim 7, wherein the voice signal meets the preset condition when voiceprint information in the voice signal matches preset voiceprint information.

19. The wearable device according to claim 9, wherein the query request is carried in a directed broadcast packet.

20. The wearable device according to claim 9, wherein the query request is forwarded to the wearable device from a cloud server.

* * * * *